United States Patent [19]
Kobayashi et al.

[11] Patent Number: 6,009,254
[45] Date of Patent: Dec. 28, 1999

[54] PROCESSING APPARATUS HAVING REDUCED BUS LENGTHS BETWEEN OPERATING UNITS AND REGISTER FILE

[75] Inventors: Hiroyuki Kobayashi; Yukihiko Shimazu, both of Tokyo, Japan

[73] Assignee: Mitsubishi Denki Kabushiki Kaisha, Tokyo, Japan

[21] Appl. No.: 08/758,244

[22] Filed: Nov. 27, 1996

[30] Foreign Application Priority Data

Jul. 30, 1996 [JP] Japan ..................................... 8-200846

[51] Int. Cl.⁶ ...................................................... G06F 15/00
[52] U.S. Cl. ........................... 395/500.11; 700/5; 711/149
[58] Field of Search ......................... 395/800.24, 800.32, 395/800.41, 705, 500.11, 500.09, 500.1, 500.3; 364/488, 489, 490, 491, 134; 365/177, 189.05, 189.12, 240, 189.04, 230.05; 711/149, 147, 153, 173; 712/24, 32, 41, 11, 22, 23, 33, 215; 700/5; 710/126, 128; 345/519

[56] References Cited

U.S. PATENT DOCUMENTS

| | | | |
|---|---|---|---|
| 3,969,724 | 7/1976 | Anderson et al. | 712/245 |
| 4,164,031 | 8/1979 | Lou et al. | 365/233 |
| 5,301,340 | 4/1994 | Cook | 712/24 |

FOREIGN PATENT DOCUMENTS

| | | |
|---|---|---|
| 4-288659 | 10/1992 | Japan . |
| 4-288660 | 10/1992 | Japan . |

OTHER PUBLICATIONS

Floorplan of the Alpha 21164 Chip wherein a register file and processing units are arranged in a horizontal or vertical row, *Digital Technical Journal*, vo. 7, No. 12, p. 102 (1995).

*Primary Examiner*—John A. Follansbee
*Attorney, Agent, or Firm*—Burns, Doane, Swecker & Mathis, LLP

[57] ABSTRACT

A processing apparatus comprises a register file having a rectangle-shaped contour and including a plurality of registers each of which is comprised of a plurality of register cells, a first operating unit located opposite to a first side of the rectangular contour of the register file, a second operating unit located opposite to a second side of the rectangular contour of the register file which is opposite to the first side, a third operating unit located opposite to a third side of the rectangular contour of the register file which is different from the first and second sides, a first data bus disposed for transferring data between the first operating unit and the register file, a second data bus disposed for transferring data between the second operating unit and the register file, and a third data bus disposed for transferring data between the third operating unit and the register file.

16 Claims, 14 Drawing Sheets

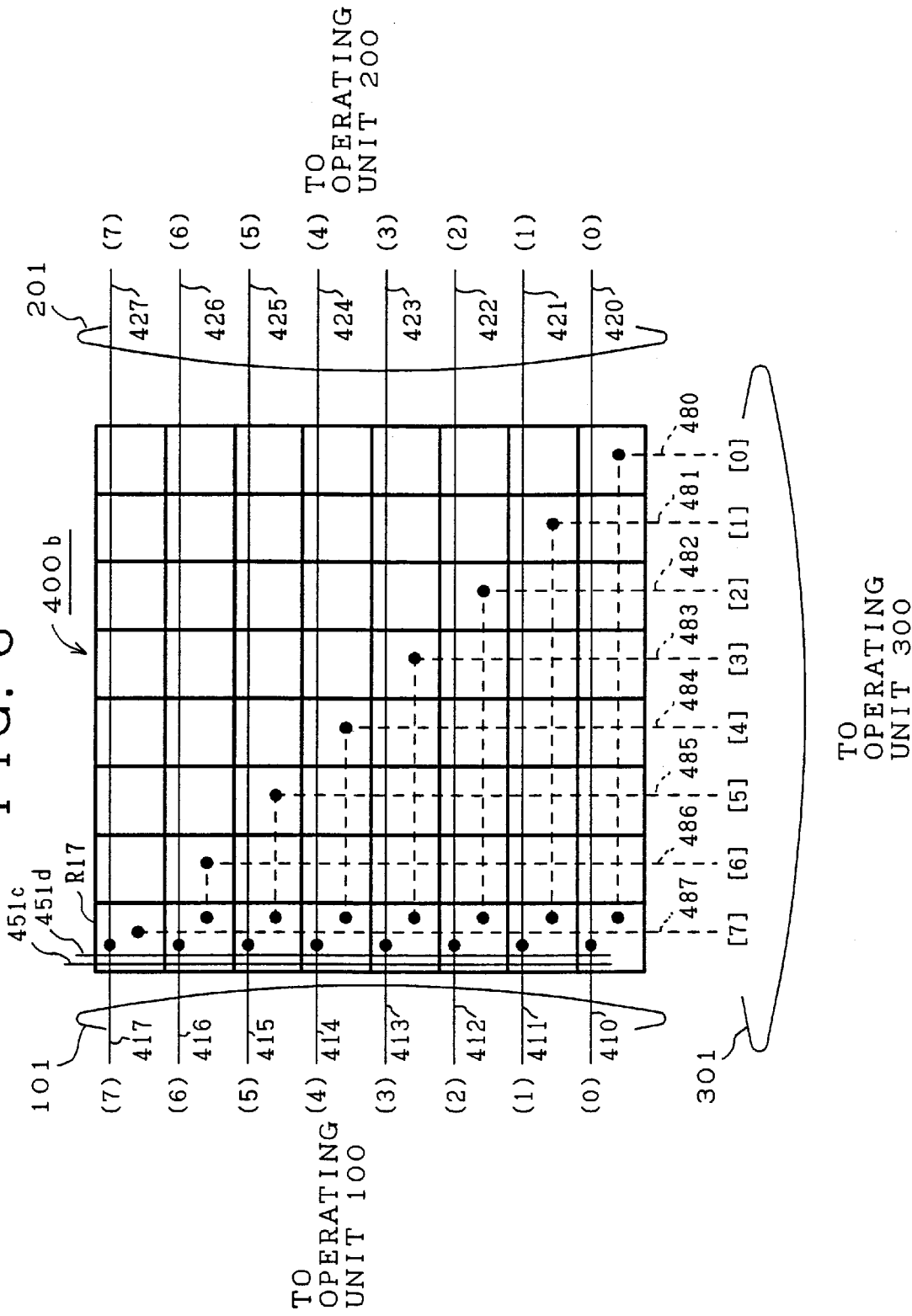

PROCESSING APPARATUS HAVING REDUCED BUS LENGTHS BETWEEN OPERATING UNITS AND REGISTER FILE

BACKGROUND OF THE INVENTION

1. Field of the Invention

The present invention relates to a processing apparatus comprising a plurality of operating units which share at least one register file.

2. Description of the Prior Art

In a data processing apparatus including two or more operating units, each of the two or more operating units and a register file are electrically connected to each other via a plurality of bus lines through which data transfer between each of the operating units and the register file is carried out. The plural operating units and the register file are arranged such that they are aligned in only a specified direction and each of the operating units are connected with the register file via a plurality of data bus lines.

Referring now to FIG. 18, there is illustrated a block diagram showing the structure of a prior art processing apparatus provided with three operating units. In the figure, each of reference numerals 10, 20, and 30 denotes an operating unit. Furthermore, reference numeral 40 denotes a register file comprised of a plurality of registers. The operating unit 10 and the register file 40 are electrically connected to each other via a data bus 11. The operating unit 20 and the register file 40 are electrically connected to each other via a data bus 21. Furthermore, the operating unit 30 and the register file 40 are electrically connected to each other via a data bus 31.

In the above configuration as shown FIG. 18, the data bus 31 between the register file 40 and the operating unit 30 is arranged such that it is running across the operating unit 20 and therefore its wiring length is longer than those of the other data buses. Each of the operating units can include a single-function block such as an arithmetic unit (ALU) or a shifter, or a relatively large-scale block constructed of a cluster of those single-function blocks. Thus, as the number of operating units is increased, the lengths of bus lines connecting each of the operating units with a register file are increased, as a corollary to an increase in the number of the operating units, and therefore loads on the processing apparatus such as parasitic capacity and resistance is increased. This results in causing a bottleneck to speeding up of the chip, reduction of power consumption, and improvement in the reliability of such the processing apparatus.

Such the prior art processing apparatus having the above-mentioned structure suffers from the problem that since as the number of operating units is increased the lengths of bus lines connecting each of the operating units with a register file are increased and therefore loads on the processing apparatus such as parasitic capacity and resistance are increased, an increase in the number of operating units causes a bottleneck to speeding up of the chip, reduction of power consumption, and improvement in the reliability of the processing apparatus.

SUMMARY OF THE INVENTION

The object of the present invention is to overcome the above problems. More precisely, it is an object of the present invention to provide a processing apparatus capable of reducing the whole lengths of bus lines electrically connecting a register file with operating units, thereby increasing the processing speed of the apparatus, reducing power consumption, improving the reliability of the processing apparatus, and improving the flexibility of designing the circuit pattern of the processing apparatus.

In accordance with one aspect of the present invention, there is provided a processing apparatus comprising: a register file having a rectangle-shaped contour and including a plurality of registers each of which is comprised of a plurality of register cells; a first operating unit located opposite to a first side of the rectangular contour of the register file; a second operating unit located opposite to a second side of the rectangular contour of the register file which is opposite to the first side; a third operating unit located opposite to a third side of the rectangular contour of the register file which is different from the first and second sides; a first data bus disposed for transferring data between the first operating unit and the register file; a second data bus disposed for transferring data between the second operating unit and the register file; and a third data bus disposed for transferring data between the third operating unit and the register file.

In accordance with a preferred embodiment of the present invention, each of the first, second, and third data buses includes a plurality of signal lines which are electrically connected to each of the plurality of registers in such a manner that data can be properly transferred between each of the first, second, and third operating units and each of the registers or between the operating units while the order of bits of the data is maintained.

In accordance with another preferred embodiment of the present invention, each of the plurality of register cells includes first and second outputs which can be handled independently in order for each of the plurality of register cells to furnish data stored therein by way of each of the first and second outputs. Furthermore, the third data bus includes a first section including a plurality of signal lines connected with the first outputs of the plurality of register cells as well as the signal lines of the first data bus and a second section including a plurality of signal lines connected with the second outputs of the plurality of register cells as well as the signal lines of the second data bus.

In accordance with another preferred embodiment of the present invention, each of the plurality of register cells includes first and second outputs which can be handled independently in order for each of the plurality of register cells to furnish data stored therein by way of each of the first and second outputs. Furthermore, the signal lines of each of the first and second data buses are connected with the first outputs of the plurality of register cells and the signal lines of the third data bus are connected with the second outputs of the plurality of register cells.

In accordance with another preferred embodiment of the present invention, each of the plurality of register cells includes an input for receiving data applied thereto so as to write the data into each of the plurality of register cells. Furthermore, at least one of the first, second, and third data bus includes a plurality of write signal lines for writing data into each of the plurality of register cells by way of the input of each of the plurality of register cells.

In accordance with another preferred embodiment of the present invention, each of the plurality of register cells includes an input for receiving data applied thereto so as to write the data into each of the plurality of register cells, and wherein at least one of the first, second, and third data bus includes a plurality of write signal lines connected to the inputs of the plurality of register cells for writing data into each of the plurality of register cells by way of the input of each of the plurality of register cells.

In accordance with another preferred embodiment of the present invention, each of the plurality of register cells includes a signal bypass unit inserted between the input and at least one output of each of the plurality of register cells, for directly connecting the input with the output in response to a control signal applied thereto so as to deliver data applied to the input by way of the output of each of the plurality of register cells.

In accordance with another preferred embodiment of the present invention, the plurality of register cells of one of the plural registers are arranged on a diagonal of the rectangular contour of the register file.

In accordance with another preferred embodiment of the present invention, the first, second, and third data buses are divided into a plurality of bus groups each including at least one data bus. Furthermore, each of the plurality of register cells includes a cell unit for latching data applied thereto, and a plurality of driver units electrically connected to the cell unit, each for amplifying data from the cell unit and driving a different bus group including at least one data bus so as to furnish the data by way of the bus group.

In accordance with another preferred embodiment of the present invention, the register file includes a shift unit for shifting data stored or to be stored in each of the plurality of registers in the register file by a shift amount specified by a control signal applied thereto.

Further objects and advantages of the present invention will be apparent from the following description of the preferred embodiments of the invention as illustrated in the accompanying drawings.

BRIEF DESCRIPTION OF THE DRAWINGS

FIG. 6 is a view showing the structure of a register file of a processing apparatus according to a third embodiment of the present invention;

DETAILED DESCRIPTION OF THE PREFERRED EMBODIMENTS

Figure 1:
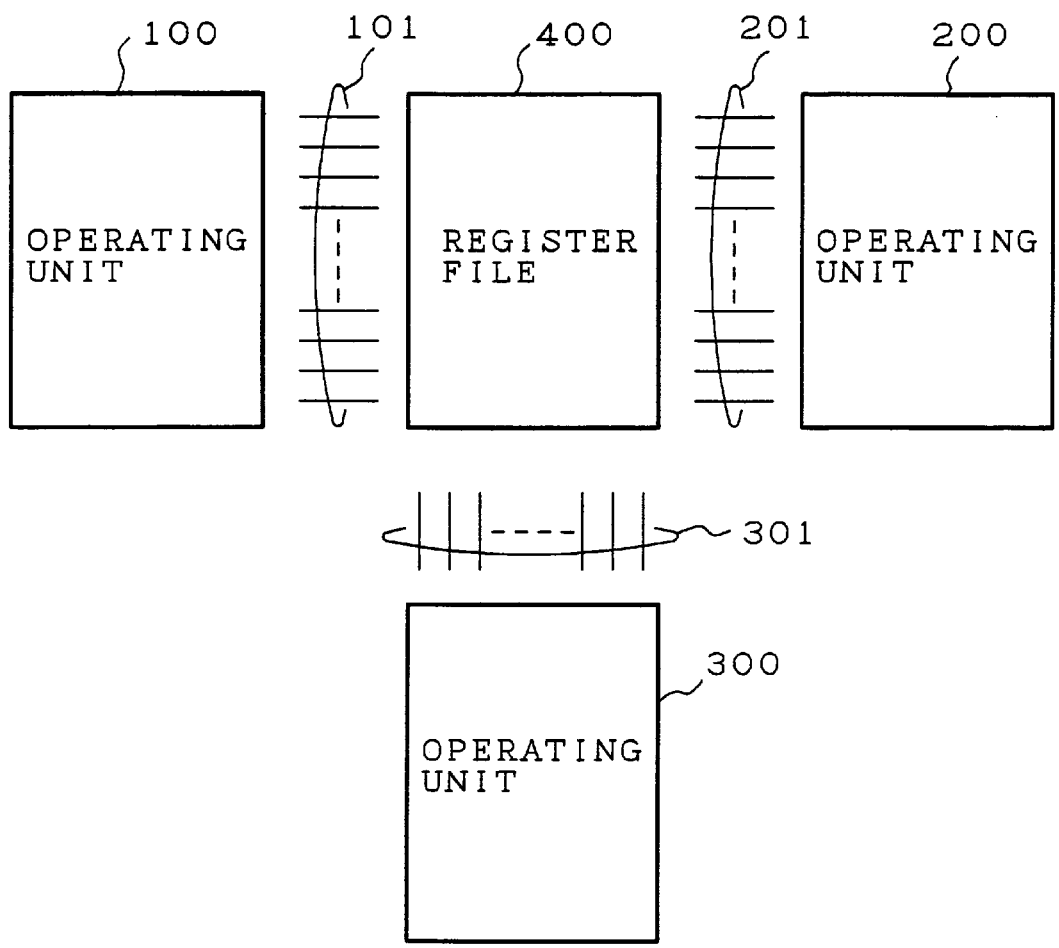
FIG. 1 is a block diagram showing the structure of a processing apparatus according to a first embodiment of the present invention.

Referring now to FIG. 1, there is illustrated a block diagram showing the structure of a processing apparatus according to a first embodiment of the present invention. In the figure, each of reference numerals 100, 200, and 300 denotes an operating unit (i.e., a first, second, or third operating unit) which is formed as a single-function block such as an arithmetic unit (ALU) or a shifter, or a block constructed of a cluster of those single-function blocks. Furthermore, reference numeral 400 denotes a register file having a rectangle-shaped contour, to which three data buses each running in one of two directions perpendicular to each other are connected, 101 denotes the data bus (or the first data bus) which electrically connects the operating unit 100 with the register file 400, 201 denotes the data bus (or the second data bus) which electrically connects the operating unit 200 with the register file 400, and 301 denotes the data bus (or the third data bus) which electrically connects the operating unit 300 with the register file 400. Thus, the first operating unit 100 is located opposite to a first side of the rectangular contour of the register file 400, the second operating unit 200 is located opposite to a second side of the rectangular contour of the register file 400 which is opposite to the first side, and the third operating unit 300 is located opposite to a third side of the rectangular contour of the register file which is different from the first and second sides.

Figure 2:
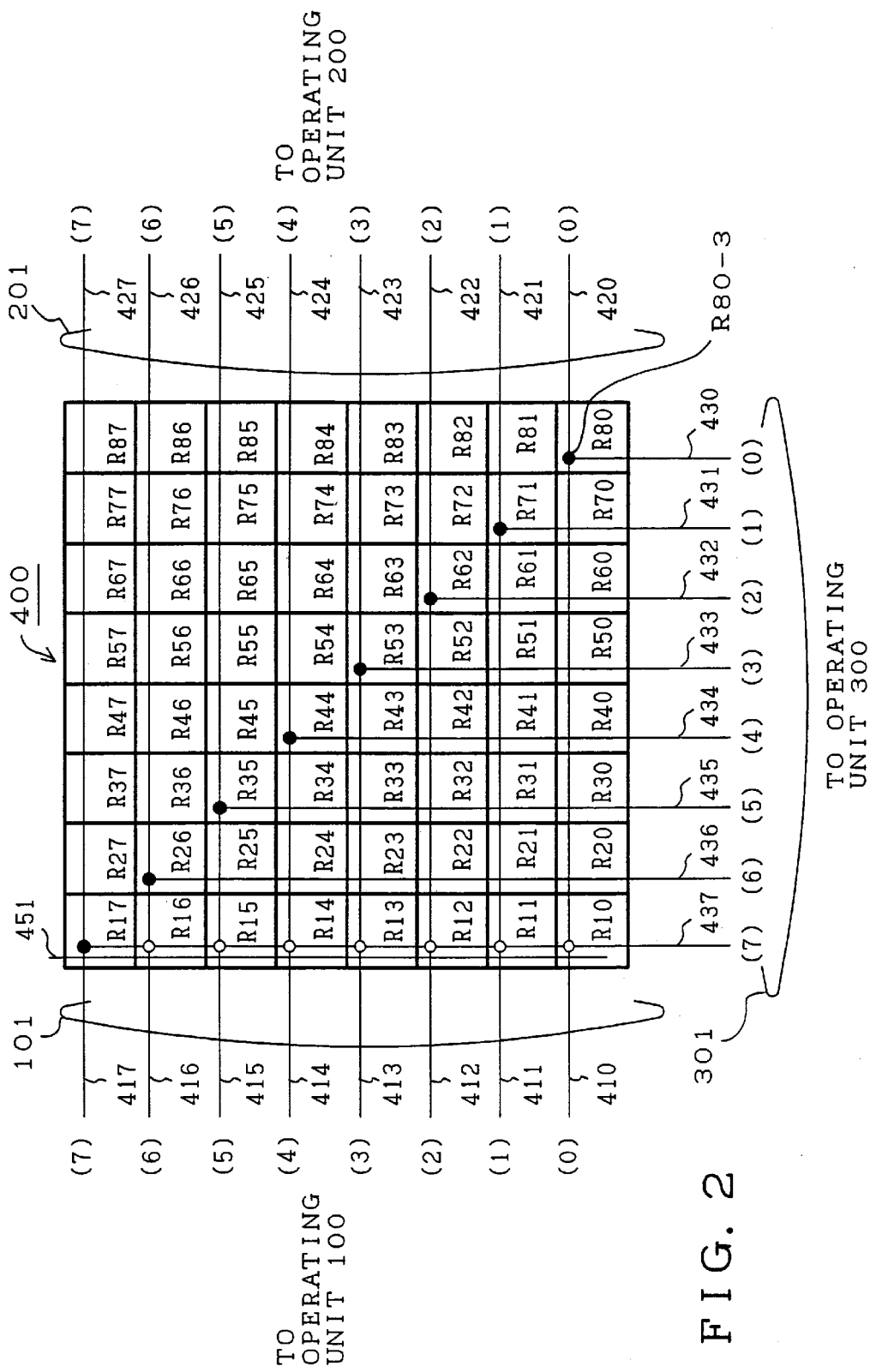
FIG. 2 is a view showing the structure of a register file of the processing apparatus according to the first embodiment of the present invention.

Referring next to FIG. 2, there is illustrated a view showing the structure of the register file 400. As shown in the figure, the register file 400 is comprised of eight 8-bit registers. That is, the register file 400 is comprised of 64 1-bit register cells Rij ($1 \leq i \leq 8$, $0 \leq j \leq 7$). The m-th 8-bit register is constructed of eight register cells Rmj ($0 \leq j \leq 7$). The value of the n-th bit of the m-th register is stored in the register cell Rmn. That is, i in Rij ($1 \leq i \leq 8, 0 \leq j \leq 7$) indicates the number of a register including the register cell Rij, and j indicates which bit in the register the register cell Rij corresponds to.

In FIG. 2, reference numeral 410 denotes a signal line which corresponds to bit 0 of the data bus 101 connecting the operating unit 100 with the register file 400. The signal line 410 is connected to the output of a register cell R10 which corresponds to bit 0 of the first register. The output of the register R10 is also connected to a connection point R80-3 located in a register cell R80. The connection point R80-3 is connected to the operating unit 300 via a bus signal line 430 which corresponds to bit 0 of the data bus 301. The connection point R80-3 is also connected to the operating unit 200 via a bus signal line 420 which corresponds to bit 0 of the data bus 201. Thus, in order to ensure the connection between the 0 bit of the data bus 301 connecting each of the register cells Ri0 (1≦i≦8) to the operating unit 300 and the 0 bits of the data buses 101 and 201 connecting each of the register cells Ri0 (1≦i≦8) to the operating units 100 and 200, the connection point R80-3 electrically connected to all the outputs of the register cells Ri0 (1≦i≦8) is located in the register cell R80 and the signal line 430 which corresponds to the 0 bit of the data bus 301 is extended from the connection point R80-3 to the operating unit 300. Similarly, the outputs of register cells R11 to R17 of the first register are respectively connected to the operating unit 100 via signal lines 411 to 417 which respectively correspond to bits 1 to 7 of the data bus 101, and are also connected to the operating unit 200 via signal lines 421 to 427 which respectively correspond to bits 1 to 7 of the data bus 201, respectively. Furthermore, like the register cells Ri0 (1≦i≦8), data stored in the register cells R11 to R17 can be furnished to the operating unit 300 via connection points respectively located at register cells R71, R62, R53, R44, R35, R26, and R17, respectively, in order to ensure the match between the order of the bits 1 to 7 of the data bus 101 and that of the bits 1 to 7 of the data bus 301, and via signal lines 431 to 437 which respectively correspond to bits 1 to 7 of the data bus 301, respectively.

In FIG. 2, reference numeral 451 denotes a register selecting signal line for selecting the first register. For simplicity of the description, only connection lines for the first register are illustrated in FIG. 2; however, in reality, the register cells R20 to R27 of the second register, register cells R30 to 87 of the third register, register cells R40 to R47 of the fourth register, register cells R50 to 57 of the fifth register, register cells R60 to R67 of the sixth register, register cells R70 to 77 of the seventh register, and register cells R80 to 87 of the eighth register are connected to the signal lines 410 to 417, 420 to 427, and 430 to 437, respectively, like the register cells R10 to R17 of the first register. Furthermore, there are provided seven other register selecting signal lines for respectively selecting the second to eighth registers, like the register selecting line 451 for the first register. By applying a selecting signal to one of the register selecting signal lines, a corresponding one of the registers can be selected.

Figure 3:
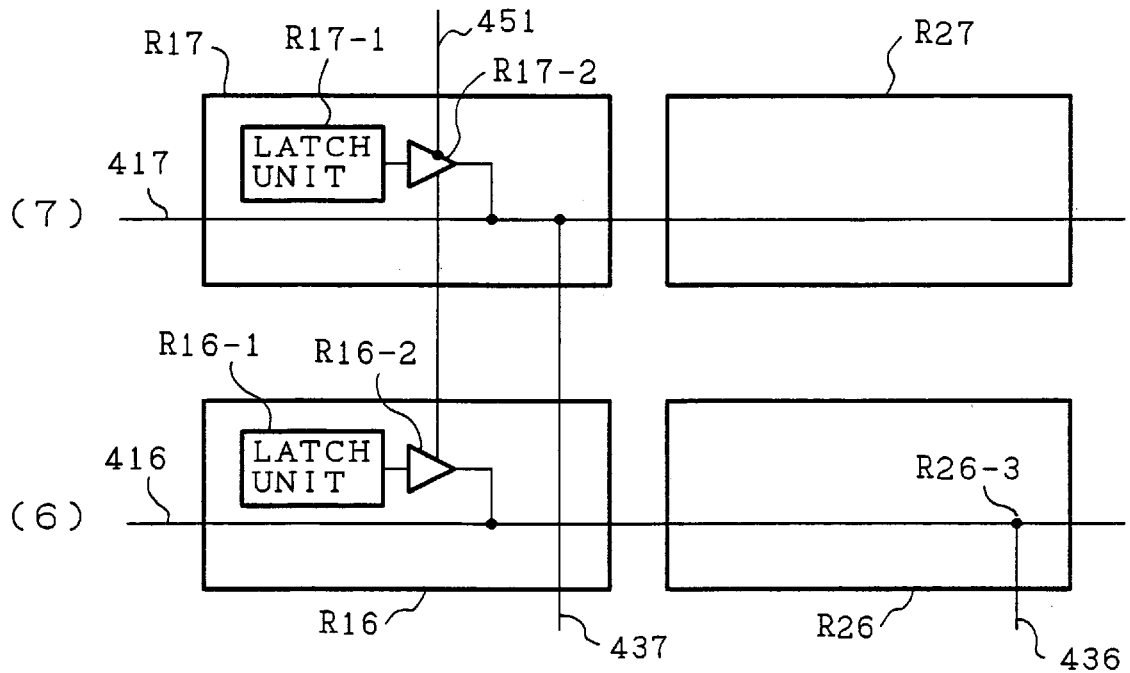
FIG. 3 is a view showing the detailed structure of a part of the register file according to the first embodiment of the present invention.

Referring now to FIG. 3, it illustrates a view showing in detail the structure of a part of the register file shown in FIG. 2. FIG. 3 shows the structure of a section of the register file 400 including the register cells R17, R16, R27, and R26. The register cell R17 is provided with a latch R17-1 which can latch data and a tristate buffer R17-2 which, in response to a selecting signal applied thereto via the register selecting signal line 451, electrically connects and disconnects the latch R17-1 to and from the signal line 417 which corresponds to the bit 7 of the data bus 101. The register cell R16 is provided with a latch R16-1 and a tristate buffer R16-2, like the register cell R17. The register cell R26 includes a connection point R26-3. The signal line 416 which corresponds to the bit 6 of the data bus 101 is connected to the register cell R16 and is further extended and connected to the operating unit 300 by way of the connection point R26-3.

Next, a description will be directed to the operation of the operating apparatus according to this embodiment. When a selecting signal is applied to one of the register selecting signal lines in order to select a corresponding one among from the plurality of registers in the register file 400, the values of the register cells Rn0 to Rn7 of the n-th (1≦n≦8) register selected are furnished to the operating units 100, 200, and 300 by way of the data buses 101, 201, and 301. Then, each of the operating units 100, 200, and 300 obtains these necessary data. For example, when the selecting signal is applied to the register selecting signal line 451, the values stored in the register cells R10 to R17 are furnished to the operating units 100, 200, and 300 by way of the data buses 101, 201, and 301.

A variant may be made in the exemplary embodiment shown. The processing apparatus can have the same structure for write data buses used for writing data into the register file 400 as that for the read buses used for reading data stored in the register file 400.

Thus, the first embodiment can reduce the length of the data bus connected between the third operating unit 300 and the register file 400, thereby increasing the processing speed of the processing apparatus, reducing power consumption, improving the reliability of the processing apparatus, and improving the flexibility of designing the circuit pattern of the processing apparatus.

Figure 4:
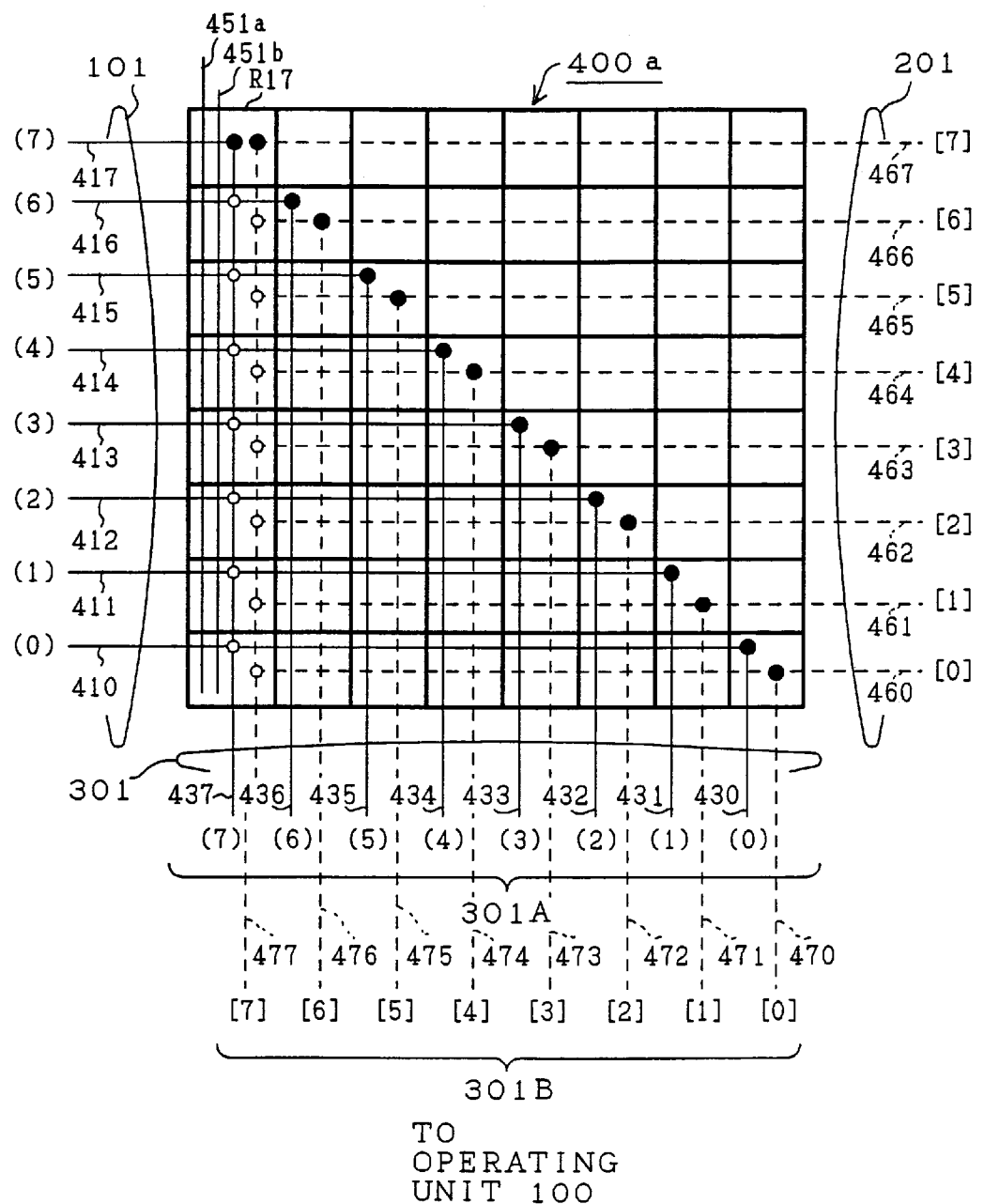
FIG. 4 is a view showing the structure of a register file of a processing apparatus according to a second embodiment of the present invention.

Referring next to FIG. 4, there is illustrated a view showing the structure of a register file 400a of a processing apparatus according to a second embodiment of the present invention. In the figure, the configuration of register cells in the register file 400a of this embodiment is the same as that of the register cells in the register file 400 of the first embodiment shown in FIG. 2. Furthermore, the same components as those shown in FIG. 2 are designated by the same reference numerals and the description about the components will be omitted hereinafter. The basic structure of the processing apparatus according to the second embodiment is the same as that of the first embodiment shown in FIG. 1. The data bus 301 connecting the register file 400a with the operating unit 300 is divided into two sections, a data bus 301A connected to the data bus 101 and hence the operating unit 100, and a data bus 301B connected to the data bus 201 and hence the operating unit 200. In addition, the structure of each of the register cells R10 to R87 differs from that of each of the register cells shown in FIG. 3, as will be explained below.

In FIG. 4, each of reference numerals 460 to 467 denotes a signal line of the data bus 201 connected between the register file 400a and the operating unit 200. The signal lines 460 to 467 are connected to the outputs of the register cells R10 to R17 of the first register, respectively. These outputs belong to a group which is different and separate from another group of outputs respectively connected to the signal lines 410 to 417 of the data bus 101. That is, each of the register cells R10 to R87 is provided with two different outputs. The first outputs indicated by the solid lines shown in FIG. 4 are connected to the operating units 100 and 300, and the second outputs indicated by the dotted lines shown in FIG. 4 are connected to the operating units 200 and 300. An output signal from the second output of each of the register cells Rn0 to Rn7 (n=0, . . . , 8) is furnished into a corresponding one of the signal lines 470 to 477 of the data bus 301B by way of a corresponding one of connection points disposed at register cells R80, R71, R62, R52, R53, R44, R35, R26, and R17. For simplicity, only the connections associated with the first register are illustrated. In reality, similar connections are established for connecting the second to eighth registers with the operating units 100, 200, and 300. The operating unit 300 is provided with two data input ports. In addition, the processing apparatus of this embodiment is provided with two register selecting signal lines 451a and 451b for the first register. A similar pair of register selecting signal lines not shown in the figure is provided for each of the other registers.

Figure 5:
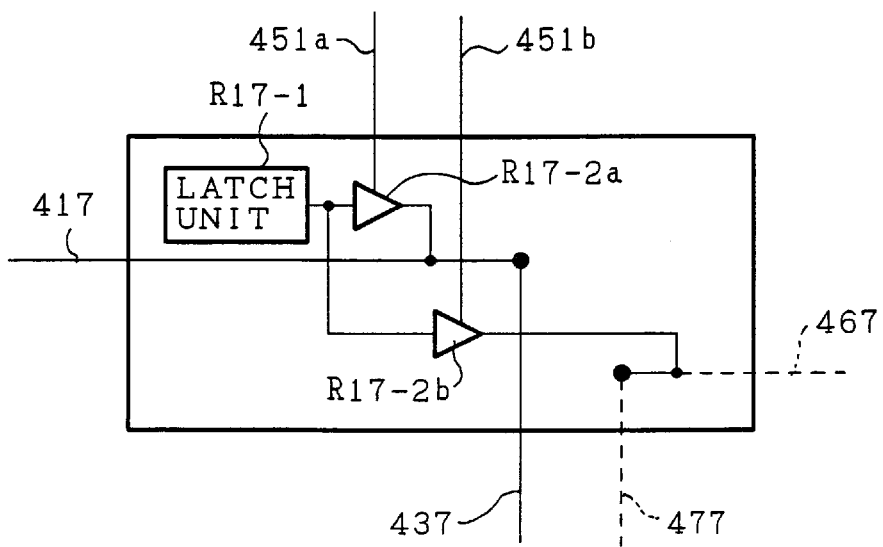
FIG. 5 is a view showing the structure of a register cell of the register file shown in FIG. 4.

Referring next to FIG. 5, there is illustrated a view showing the structure of the register cell R17 located at the upper left hand corner of the register file 400a shown in FIG. 4. The same components as those of the first embodiment shown in FIG. 3 are designated by the same reference numerals and the description about the components will be omitted hereinafter. When selecting the first register so as to furnish data stored in the first register by way of the data buses 101 and 301A, a selecting signal is applied to the first register by way of the register selecting signal line 451a. On the contrary, when selecting the first register so as to furnish data in the register by way of the data buses 201 and 301B, a selecting signal is applied to the first register by way of the register selecting signal line 451b. In FIG. 5, reference numeral R17-2a denotes a tristate buffer, responsive to a selecting signal applied thereto via the register selecting signal line 451a, for furnishing data stored in the latch R17-1 into the signal lines 417 and 437, and R17-2b denotes a tristate buffer, responsive to a selecting signal applied thereto via the register selecting signal line 451b, for furnishing data stored in the latch R17-1 into the signal lines 467 and 477. Each of other register cells has a structure similar to that of the register cell R17.

Next, a description will be made as to the operation of the processing apparatus of this embodiment. First, the description will be directed to the case where the operating units 100 and 300 read data from the first register in the register file 400a. When a selecting signal is applied to the signal line 451a, the values stored in the first register are furnished into the data buses 101 and 301A. That is, the values stored in the first register are furnished into the signal lines 410 to 417 of the data bus 101 and the signal lines 430 to 437 of the data bus 301A. The operating units 100 and 300 can refer to those data when necessary. On the other hand, when a selecting signal is applied to the signal line 451b, the values stored in the first register are furnished into the data buses 201 and 301B. That is, the values stored in the first register are furnished into the signal lines 460 to 467 of the data bus 201 and the signal lines 470 to 477 of the data bus 301B. The selecting operation for selecting another register is performed similarly to that mentioned above for selecting the first register.

Referring next to FIG. 6, there is illustrated a view showing the structure of a register file 400b of a processing apparatus according to a third embodiment of the present invention. In the figure, the configuration of register cells in the register file 400b of this embodiment is the same as that of the register cells in the register file of the first embodiment shown in FIG. 2. The same components as those in FIG. 2 are designated by the same reference numerals, and the description about the components will be omitted hereinafter. The basic structure of the processing apparatus according to the third embodiment is the same as that of the processing apparatus according to the first embodiment shown in FIG. 1. Each of the register cells is provided with first and second outputs. By way of the first output of each of the register cells, data can be furnished into the data buses 101 and 201 respectively connected to the operating units 100 and 200, and, by way of the second output of each of the register cells, data can be furnished into the data bus 301 connected to the operating unit 300. The structure of each of the register cells R10 to R87 differs from that of each of the register cells shown in FIG. 3.

In FIG. 6, reference numerals 480 to 487 denote signal lines of the data bus 301 connected between the register file 400b and the operating unit 300, respectively. The signal lines 480 to 487 are connected to the second outputs of the register cells R10 and R17. These outputs belong to a group which is different and separate from another group of the first outputs of the register cells R10 and R17 respectively connected to the data buses 101 and 201. Each of the register cells R10 to R87 is provided with such the two different outputs. Furthermore, the signal lines indicated by the solid lines shown in FIG. 6 are commonly connected to the operating units 100 and 300, and the signal lines indicated by the dotted lines shown in FIG. 6 are connected to the operating unit 300. An output signal from the second output of each of the register cells Rn0 to Rn7 ($0 \leq n \leq 8$) is furnished into a corresponding one of the signal lines 480 to 487 of the data bus 301 by way of a corresponding one of connection points disposed in register cells R80, R71, R62, R52, R53, R44, R35, R26, and R17. For simplicity, only the connections associated with the first register are illustrated. In reality, similar connections are established for connecting the second to eighth registers with the operating units 100, 200, and 300.

Figure 7:
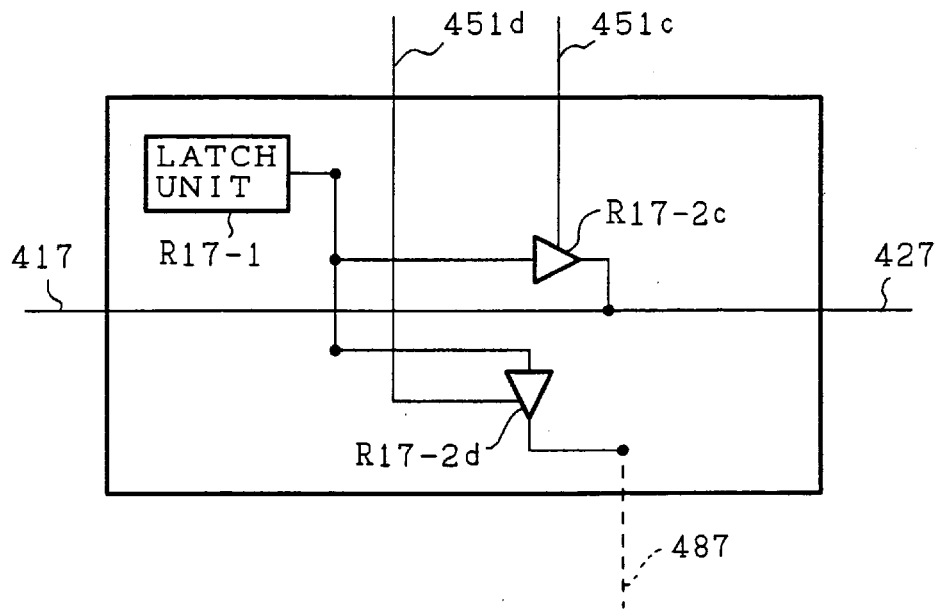
FIG. 7 is a view showing the structure of a register cell of the register file shown in FIG. 6.

Referring next to FIG. 7, there is illustrated a view showing the structure of the register cell R17 located at the upper-left side corner of the register file 400b shown in FIG. 6. The same components as those of the second embodiment shown in FIG. 5 are designated by the same reference numerals and the description about the components will be omitted hereinafter. In FIG. 7, reference numeral 451c denotes to a signal line through which a signal for selecting the first register is applied to the first register in order to furnish data in the first register by way of the signal lines of the data buses 101 and 201, and 451d denotes to a signal line through which a signal for selecting the first register is applied to the first register in order to furnish data in the first register by way of the signal lines of the data bus 301. Furthermore, reference numeral R17-2c denotes a tristate buffer, responsive to a selecting signal applied thereto via the signal line 451c, for furnishing data stored in the latch R17-1 into the signal line 417 of the data bus 101 and signal line 427 of the data bus 201, and R17-2d denotes a tristate buffer, responsive to a selecting signal applied thereto via the signal line 451d, for furnishing data stored in the latch R17-1 into the signal line 487 of the data bus 301. Each of the other register cells has a structure similar to that of the register cell R17.

Next, a description will be made as to the operation of the processing apparatus of this embodiment. First, the description will be directed to the case where the operating units 100 and 200 read data from the first register in the register file 400b. When a selecting signal is applied to the signal line 451c, the values stored in the first register are furnished into the data buses 101 and 201. That is, the values stored in the first register are furnished into the operating units 100 and 200 by way of the signal lines 410 to 417 of the data bus 101 and the signal lines 420 to 427 of the data bus 201. Then, the operating units 100 and 200 can refer to those data when necessary. On the other hand, when a selecting signal is applied to the signal line 451d, the values stored in the first register are furnished into the data bus 301. That is, the values stored in the first register are furnished to the operating unit 300 by way of the signal lines 480 to 487 of the data bus 301. The selecting operation for selecting another register is performed similarly to that mentioned above for selecting the first register.

Figure 8:
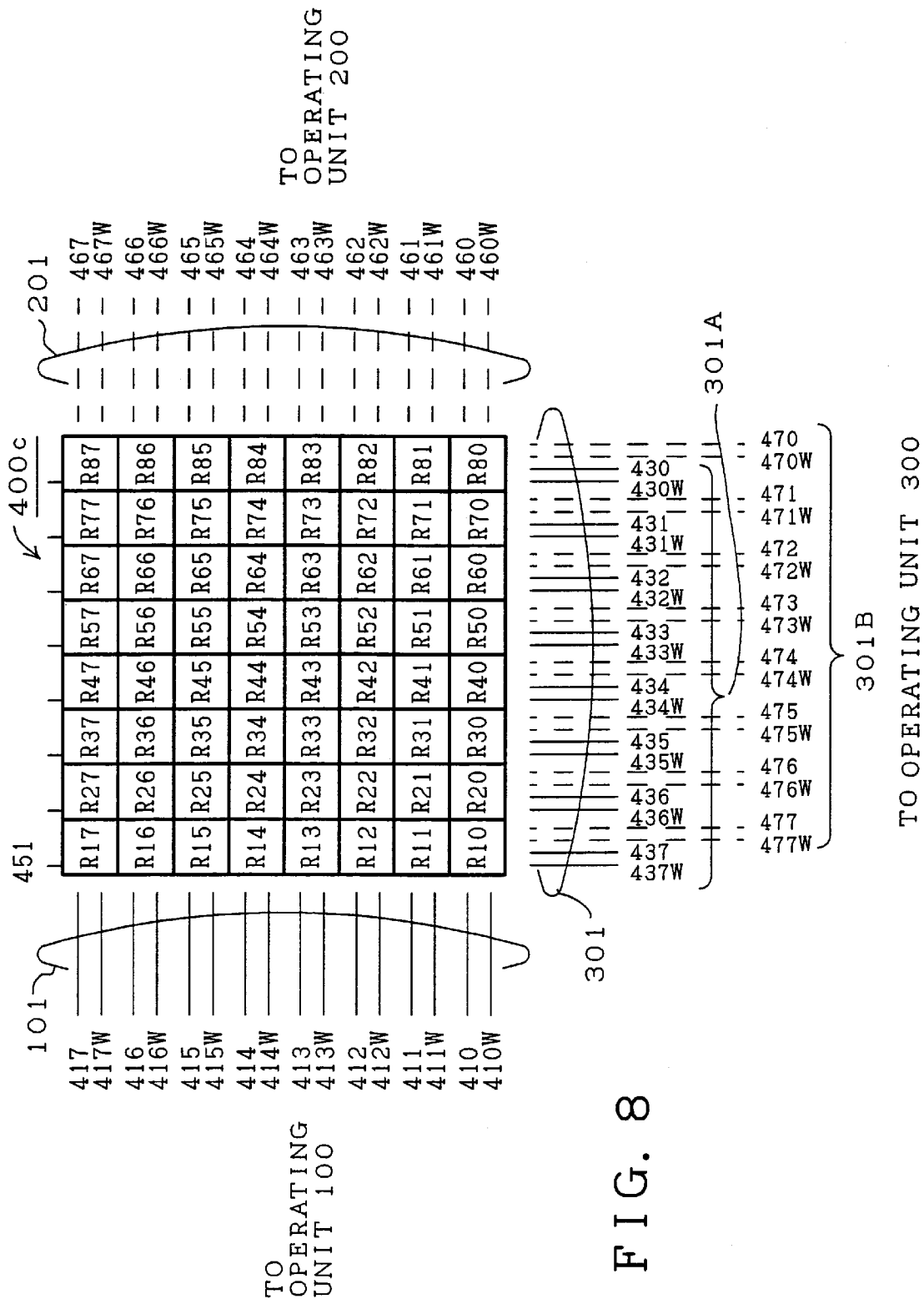
FIG. 8 is a view showing the structure of a register file of a processing apparatus according to a fourth embodiment of the present invention.

Referring next to FIG. 8, there is illustrated a view showing the structure of a register file 400c of a processing apparatus according to a fourth embodiment of the present invention. The basic structure of the processing apparatus according to the fourth embodiment is the same as that of the processing apparatus according to the first embodiment shown in FIG. 1. The register file 400c has a structure similar to that of the register file 400a shown in FIG. 4. In the fourth embodiment, the data bus 101 includes a plurality of data write signal lines 410W to 417W used for writing data into the register file 400c in addition to the data read signal lines 410 to 417. The data bus 201 includes a plurality of data write signal lines 460W to 467W used for writing data into the register file 400c in addition to the data read signal lines 460 to 467. In addition, the data bus 301A includes a plurality of data write signal lines 430W to 437W used for writing data into the register file 400c in addition to the data read signal lines 430 to 437, and the data bus 301B includes a plurality of data write signal lines 470W to 477W used for writing data into the register file 400c in addition to the data read signal lines 470 to 477.

Figure 9:
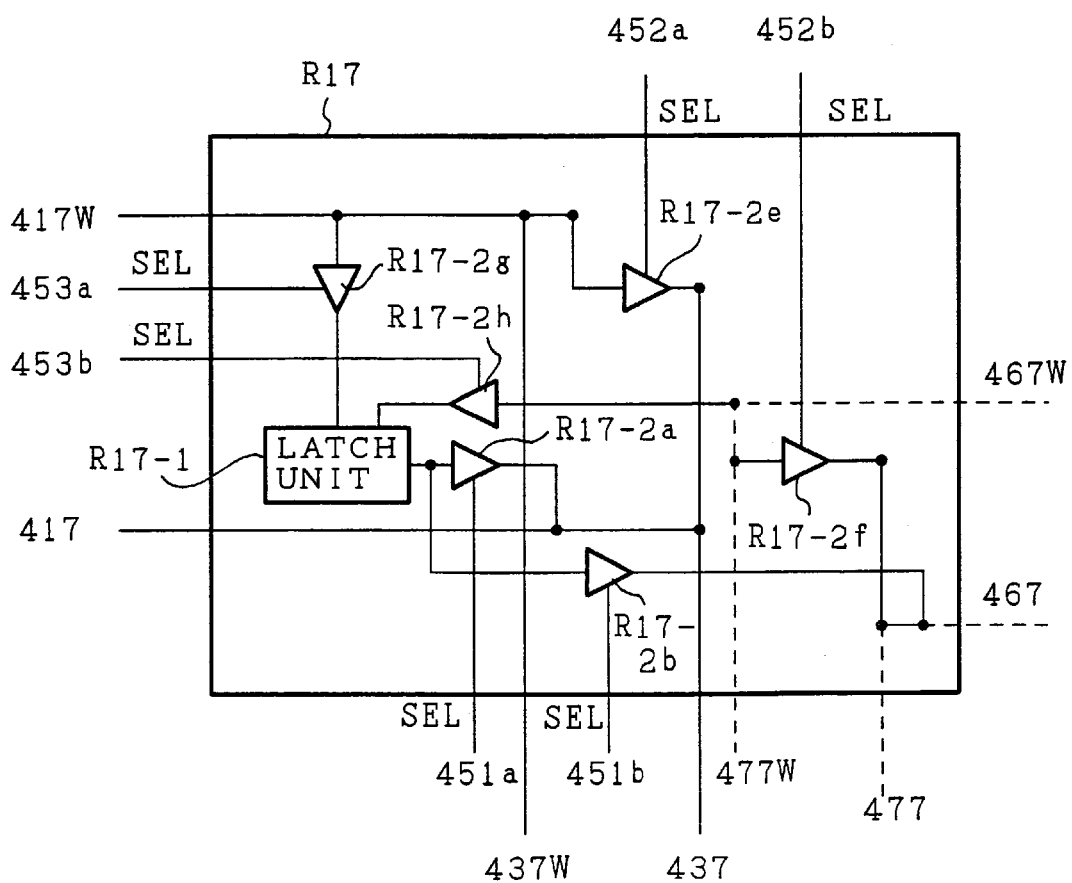
FIG. 9 is a view showing the structure of a register cell of the register file shown in FIG. 8.

Referring next to FIG. 9, there is illustrated a view showing the structure of the register cell R17 located at the upper-left side corner of the register file 400c shown in FIG. 8. In the figure, the same components as those of the second embodiment shown in FIG. 5 are designated by the same reference numerals and the description about the components will be omitted hereinafter. Reference numeral R17-2g denotes a tristate buffer, responsive to a selecting signal SEL applied thereto via a control signal line 453a, for allowing the latch R17-1 to latch and hold data on the signal line 417W, R17-2h denotes a tristate buffer, responsive to a selecting signal SEL applied thereto via a control signal line 453b, for allowing the latch R17-1 to latch and hold data on the signal line 467W, R17-2e denotes a tristate buffer, responsive to a selecting signal SEL applied thereto via a signal line 452a, for furnishing a signal on the signal line 417W into the signal line 437, and R17-2f denotes a tristate buffer, responsive to a selecting signal SEL applied thereto via a signal line 452b, for furnishing a signal on the signal line 467W or 477W into the signal line 477 or 467. Each of the other register cells in the register file 400c has a structure similar to that of the register cell R17 shown in FIG. 9. The connections in the register file 400c between the data read signal lines 410 to 417, 460 to 467, 430 to 437, and 470 to 477 and the register cells R10 to R87 are established similarly to those in the register file 400a shown in FIG. 4. In the fourth embodiment, the data write signal lines 410W to 417W, 460W to 467W, 430W to 437W, and 470W to 477W are connected to the register cells Rn0 to Rn7 ($1 \leq n \leq 8$) of the n-th register, respectively, like the data read signal lines 410 to 417, 460 to 467, 430 to 437, and 470 to 477.

Next, a description will be made as to the operation of the processing apparatus of this embodiment. The register file 400c shown in FIG. 8 is a cluster of eight 8-bit registers. Thus, in general, a writing or reading operation can be carried out once for 8 bits of data (i.e., byte by byte). However, for simplicity, a description will be made as to processes of writing and reading 1-bit data into and from the register cell R17 and a process of transferring 1-bit data from one operating unit to another operating unit by way of the register cell R17 without allowing the register cell to latch the data, with reference to FIG. 9.

First, the description will be directed to the case where the latch R17-1 in the register cell R17 latches data delivered by the operating unit 100 and then the operating unit 300 read the latched data from the latch R17-1. When a selecting signal SEL is applied to the control signal line 453a, data on the signal line 417W furnished by the operating unit 100 is allowed to reach the latch R17-1 by the tristate buffer R17-2g, and is then held by the latch. Then, a selecting signal SEL is applied to the control signal line 451a, and the tristate buffer R17-2a allows the latch R17-1 to furnish the data latched by the latch R17-1 into the signal line 437. Then, the operating unit 300 receives the data on the signal line 437 and performs arithmetic on the data, for example.

Next, the description will be directed to the case where data is transferred from the operating unit 100 to the operating unit 300 without allowing the register cell R17 to latch the data. After the operating unit 100 furnishes data into the signal line 417W, a selecting signal SEL is applied to the control signal line 452a. Then, the tristate buffer R17-2e delivers the data applied thereto into the signal line 437. The operating unit 300 receives the data on the signal line 437 and performs arithmetic on the data, for example.

In addition, data transfer between the operating unit 200 and the operating unit 300 can be carried out by using the tristate buffer R17-2f without allowing the latch R17-1 of the register cell R17 to latch data to be transferred.

Figure 10:
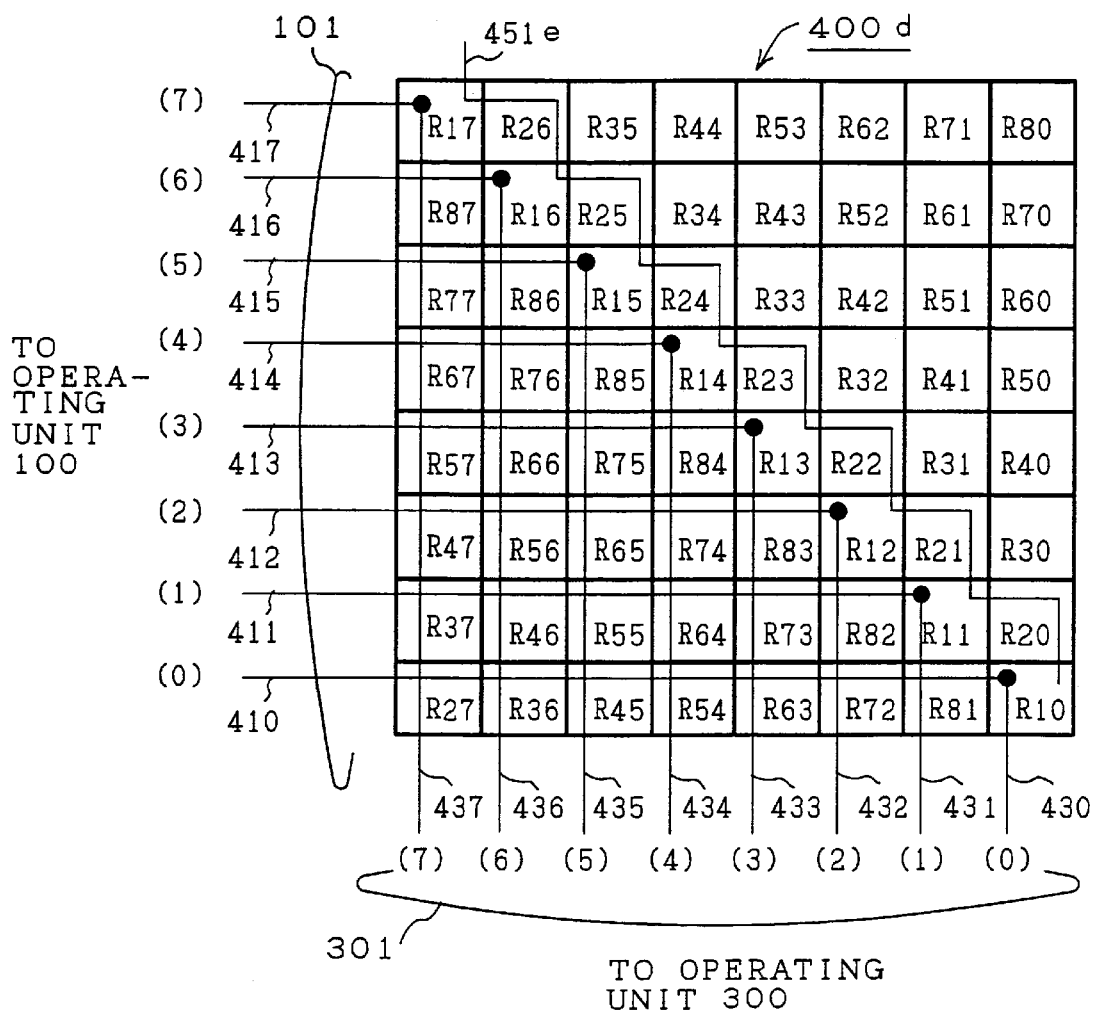
FIG. 10 is a view showing the structure of a register file of a processing apparatus according to a fifth embodiment of the present invention.

Referring next to FIG. 10, there is illustrated a view showing the structure of a register file 400d of a processing apparatus according to a fifth embodiment of the present invention. The basic structure of the processing apparatus according to the fifth embodiment is the same as that of the processing apparatus according to the first embodiment shown in FIG. 1. For simplicity of description, a description will be made as to only the operating units 100 and 300 and the description about the operating unit 200 will be omitted hereinafter.

The first register comprised of register cells R1j ($0 \leq j \leq 7$) in the register file 400d of the fifth embodiment is arranged on a diagonal of the rectangle-shaped register file 400d, as shown in FIG. 10. Similarly, the register cells Rnj ($0 \leq j \leq 7$) of the other n-th ($2 \leq n \leq 8$) register are arranged in the same diagonal direction. Such the arrangement makes it possible to eliminate the need for providing connection points to ensure the match between the order of bits of the data bus 101 and the order of bits of the data bus 300 at register cells R80, R71, R62, R53, R44, R35, R26, and R17. Furthermore, since the sum of the lengths of the signal lines connecting the register cells R1j ($0 \leq j \leq 7$) with the operating unit 100 are equal to the sum of the lengths of the signal lines connecting the register cells R1j ($0 \leq j \leq 7$) with the operating unit 300, the bus load due to the data bus 101 connecting the first register to the operating unit 100 is nearly equal to that due to the data bus 301 connecting the first register to the operating unit 300. This noticeable configuration makes it possible to use the first register as a register which can be accessed at frequent intervals such as an accumulator. In order to select the first register comprised of the register cells R1j ($0 \leq j \leq 7$) from the register file 400d, a selecting signal is applied to the register cells via a register selecting signal line 451e, as shown in FIG. 10. Similar selecting signal line not shown in the figure is provided for each of the other registers.

Figure 11:
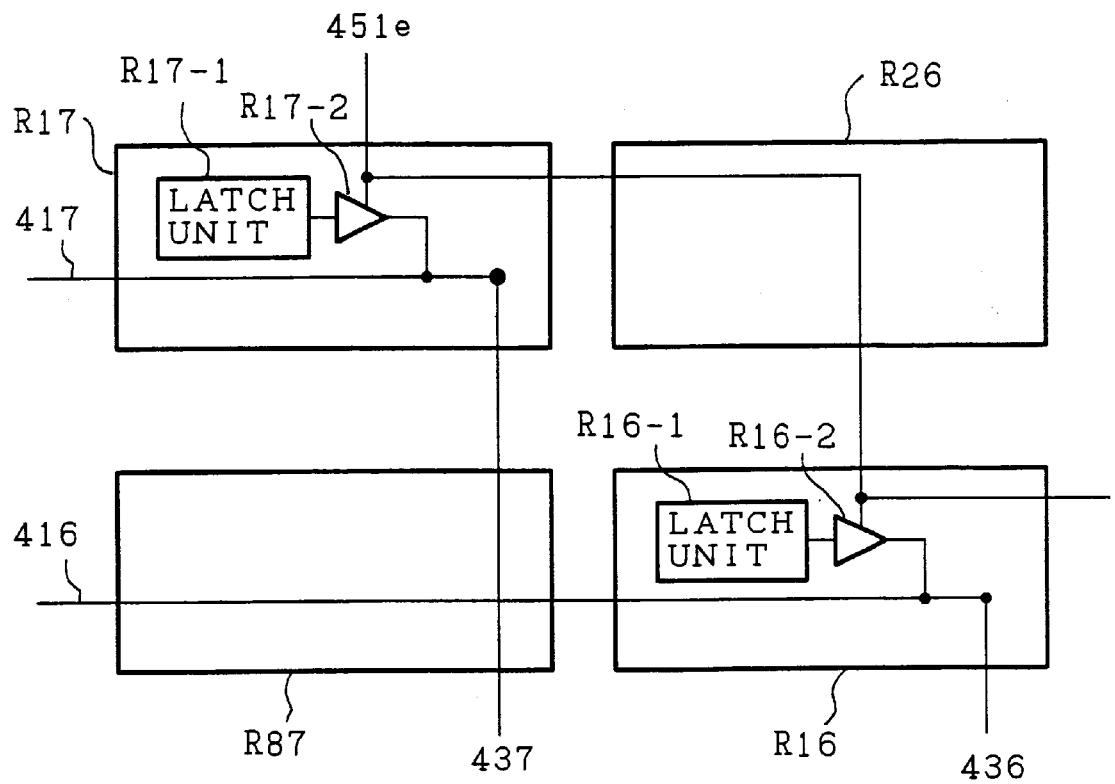
FIG. 11 is a view showing the structure of register cells which construct a part of the register file shown in FIG. 10.

Referring next to FIG. 11, there is illustrated a view showing register cells which construct a part of the register file 400d shown in FIG. 10. The same components as those of the first embodiment shown in FIG. 3 are designated by the same reference numerals and the description about the components will be omitted hereinafter. The signal line 451e is wired like stairs within the register file to furnish a control signal to tristate buffers R16-2 and R17-2 which, in response to the control signal, can connect the outputs of latches R16-1 and R17-1 with the signal lines 416, 436 and 417, 437, respectively.

Figure 12:
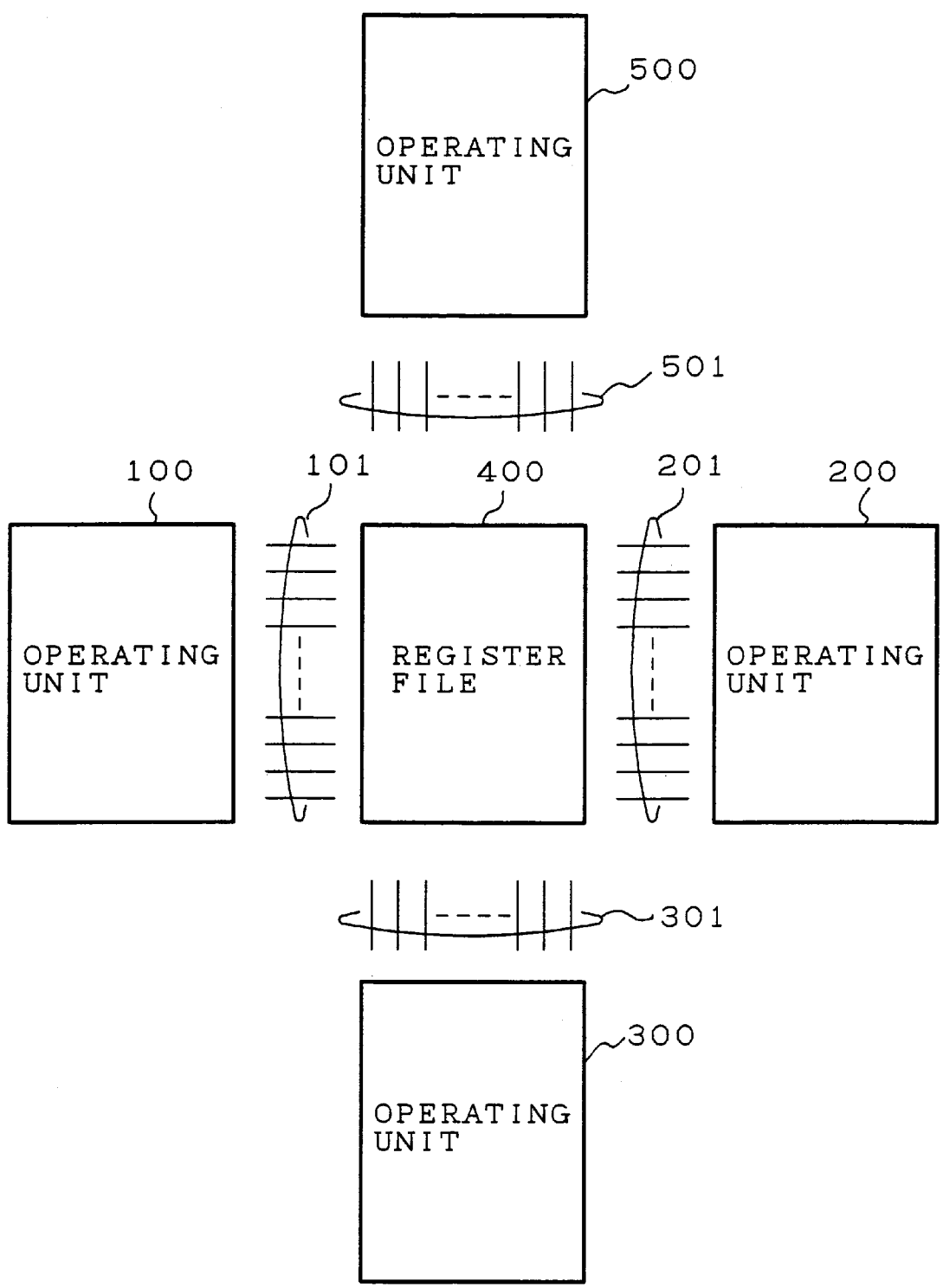
FIG. 12 is a block diagram showing the structure of a processing apparatus according to a sixth embodiment of the present invention.

Referring now to FIG. 12, there is illustrated a block diagram showing the structure of a processing apparatus according to a sixth embodiment of the present invention. As previously mentioned, the processing apparatus according to the first, second, third, fourth, or fifth embodiment of the present invention is provided with one register file 400 and three operating units 100, 200, and 300. On the contrary, the processing apparatus according to this embodiment is further provided with another operating unit 500 connected to the register file 400 by way of a data bus 501, as shown in FIG. 12.

Figure 13:
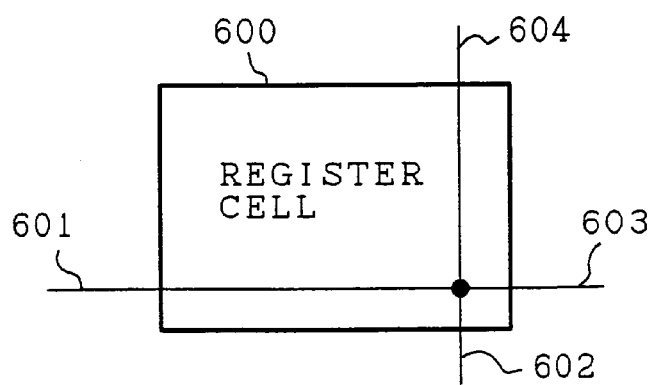
FIG. 13 is a view showing an example of a register cell of a register file of the processing apparatus according to the sixth embodiment of the present invention.

Referring now to FIG. 13, there is illustrated a view showing the structure of an example of a register cell in the register file 400 according to this embodiment. In the figure, reference numeral 601 denotes a signal line of the data bus 101 which connects the operating unit 100 with the register file 400, 602 denotes a signal line of the data bus 301 which connects the operating unit 300 with the register file 400, 603 denotes a signal line of the data bus 201 which connects the operating unit 200 with the register file 400, and 604 denotes a signal line of the data bus 501 which connects the operating unit 500 with the register file 400. The register cell 600 includes a driver unit for amplifying a signal latched. The signal lines 601 to 604, i.e., the data buses 101, 201, 301, and 501 can be driven or handled simultaneously.

Figure 14:
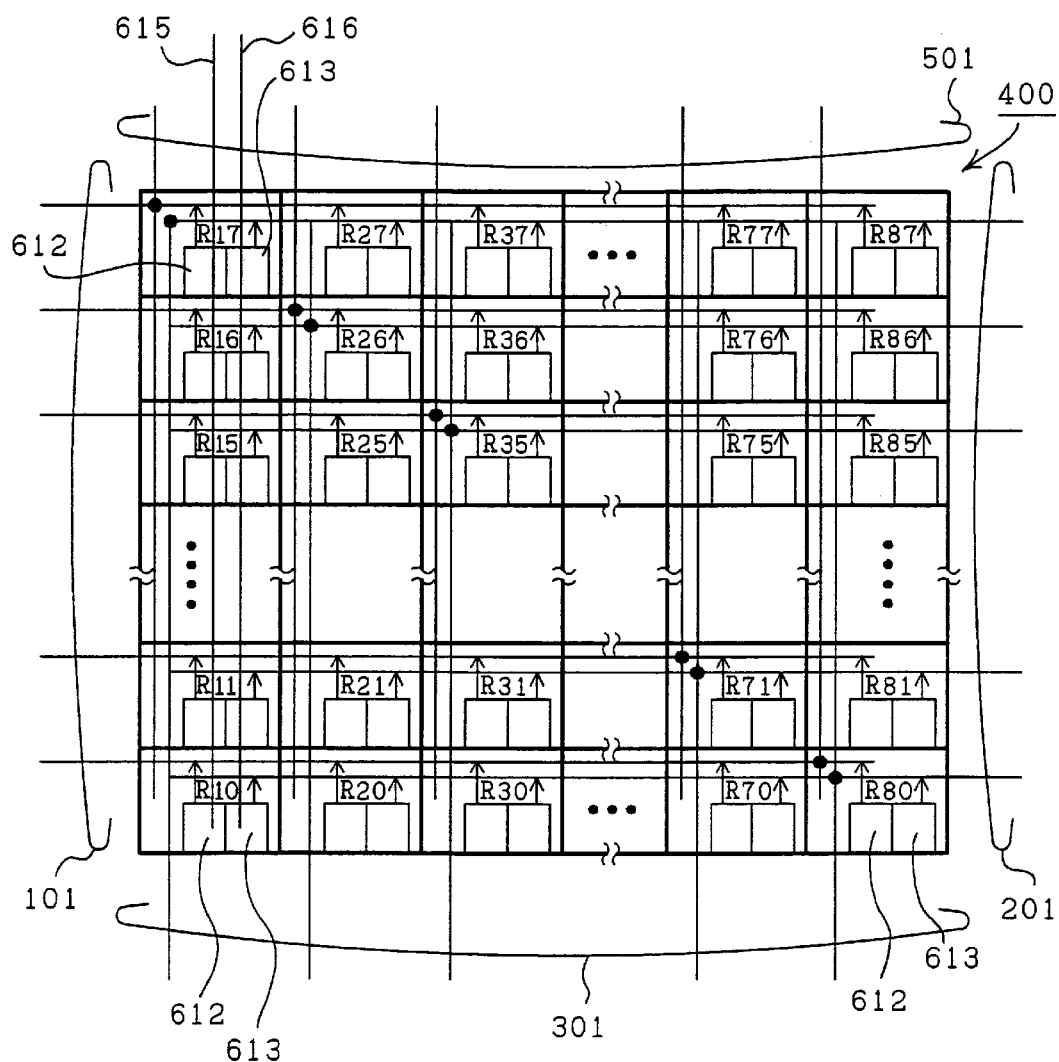
FIG. 14 is a view showing the structure of a register file of the processing apparatus according to a variant of the sixth embodiment of the present invention.

Some variants may be made in the above exemplary embodiment shown. For example, each of the data buses can be driven independently, and two groups each including two data buses can be alternatively driven independently. Referring now to FIG. 14, there is illustrated a view showing the structure of a register file 400 of a processing apparatus according to a variant of the sixth embodiment of the present invention. In the figure, the configuration of register cells in the register file 400 is the same as that of the register cells in the register file 400 of the first embodiment shown in FIG. 2. The same components as those shown in FIG. 2 are designated by the same reference numerals, and the description about the components will be omitted hereinafter. As will be explained in detail below, each of the register cells is provided with a cell unit not shown for latching data applied thereto, a first driver unit 612 for amplifying data stored in the cell unit so as to furnish the data to the operating units 100 and 500, and a second driver unit 613 for amplifying data stored in the cell unit so as to furnish the data to the operating units 200 and 300. In addition, for each of the registers there is provided a pair of a driver control signal line 615 for enabling the first driver of each of the register cells of each of the registers and a driver control signal line 616 for enabling the second driver of each of the register cells of each of the registers.

Figure 15:
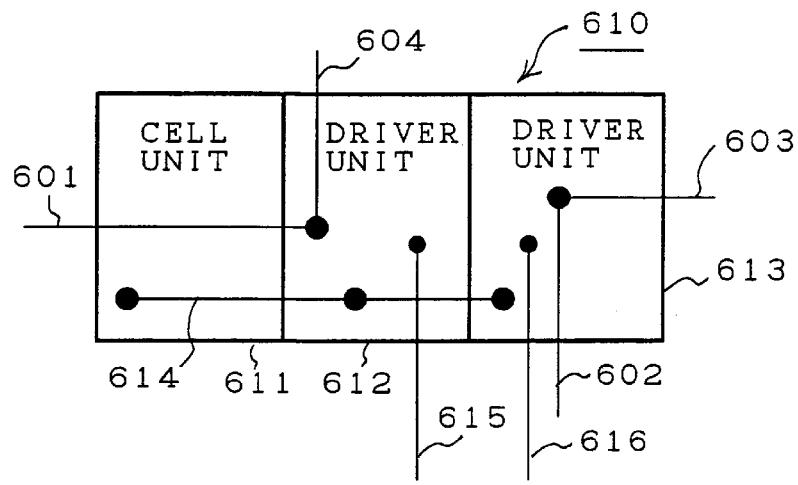
FIG. 15 is a view showing the structure of a register cell of the register file shown in FIG. 14.

Referring next to FIG. 15, there is illustrated a view showing the structure of a register cell in the register file 400 of the above-mentioned variant. The same components as those shown in FIG. 13 are designated by the same reference numerals and the description about the components will be omitted hereinafter. As mentioned above, the register cell 610 is provided with the cell unit 611 for latching data applied thereto, and the driver units 612 and 613 for amplifying a data signal. The output of the cell unit 611 is electrically connected to the inputs of the driver units 612 and 613 by way of a local bus 614. Signal lines 601 and 604 are commonly connected to the output of the driver unit 612, and signal lines 602 and 603 are commonly connected to the output of the driver unit 613. As previously mentioned, the first driver unit 612 is adapted to drive one signal line 601 of the data bus 101 and one signal line 604 of the data bus 501, and the second driver unit 613 is adapted to drive one signal line 603 of the data bus 201 and one signal line 602 of the data bus 301. When a control signal is applied to one of a pair of driver control signal lines connected to one of the eight registers, the corresponding driver units of the plurality of register cells in the register are enabled and data stored in the register is furnished into the corresponding data buses. When a control signal is applied to the driver control signal line 615 connected to the register cell 610 shown in FIG. 15, the first driver unit 612 outputs the value of the register cell 610 stored in the cell unit 611 to the signal lines 601 and 604. Simultaneously, the other register cells of the same register furnish the values stored therein into the other signal lines of the data buses 101 and 501. Furthermore, the processing unit can be adapted to enable the second driver units 613 of one register so as to furnish data stored in the register into the data buses 201 and 301 while enabling the first driver units 612 of another register as mentioned above. Thus, by dividing the plural data buses into two groups each including two data buses and providing the two driving units respectively connected to the two data bus groups within each of the register cells, the processing apparatus can make the driver units 612 and 613 disposed in each of the register cells drive the two data bus groups simultaneously and independently. As a result, two 8-bit data stored in different two registers can be simultaneously delivered to the operating units 101 and 501 and the operating units 201 and 301 by way of the two data bus groups, respectively. Furthermore, the load on each of the driver units 612 and 613 can be reduced.

Figure 16:
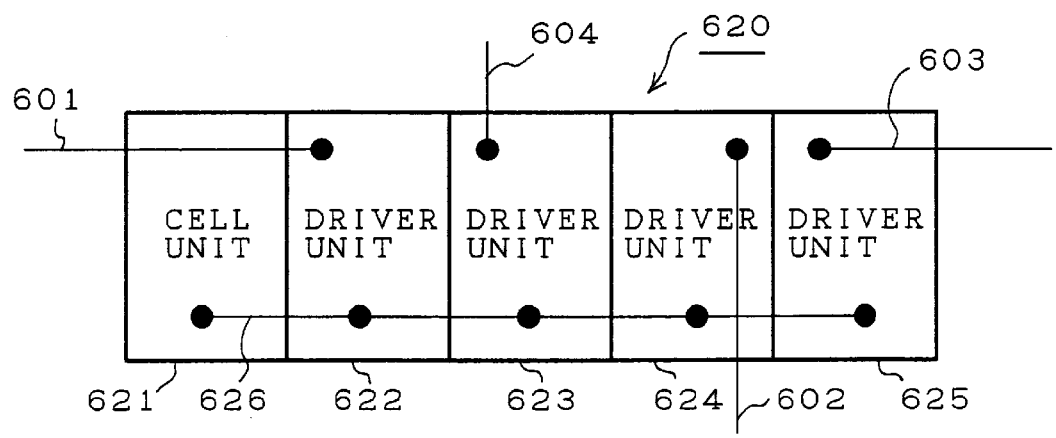
FIG. 16 is a view showing the structure of a register cell of a register file according to another variant of the sixth embodiment of the present invention.

Referring next to FIG. 16, there is illustrated a view showing the structure of another variant of a register cell in the register file 400 according to the sixth embodiment. The same components as those shown in FIG. 13 are designated by the same reference numerals and the description about the components will be omitted hereinafter. The register cell 620 is provided with a cell unit 621 for latching data applied thereto, and driver units 622 to 625 each for amplifying a data signal applied thereto. The output of the cell unit 621 is electrically connected to the inputs of the driver units 622 to 625 by way of a local bus 626. Signal lines 601, 604, 602, and 603 are connected to the outputs of the driver units 622 to 625, respectively. Each of the driver units 622 to 625 is adapted to drive the respective signal line of the corresponding data bus connected to each of them. Therefore, the structure of the register cell as shown in FIG. 16 makes it possible to further reduce the load on each of the driver units 622 to 625.

Figure 17:
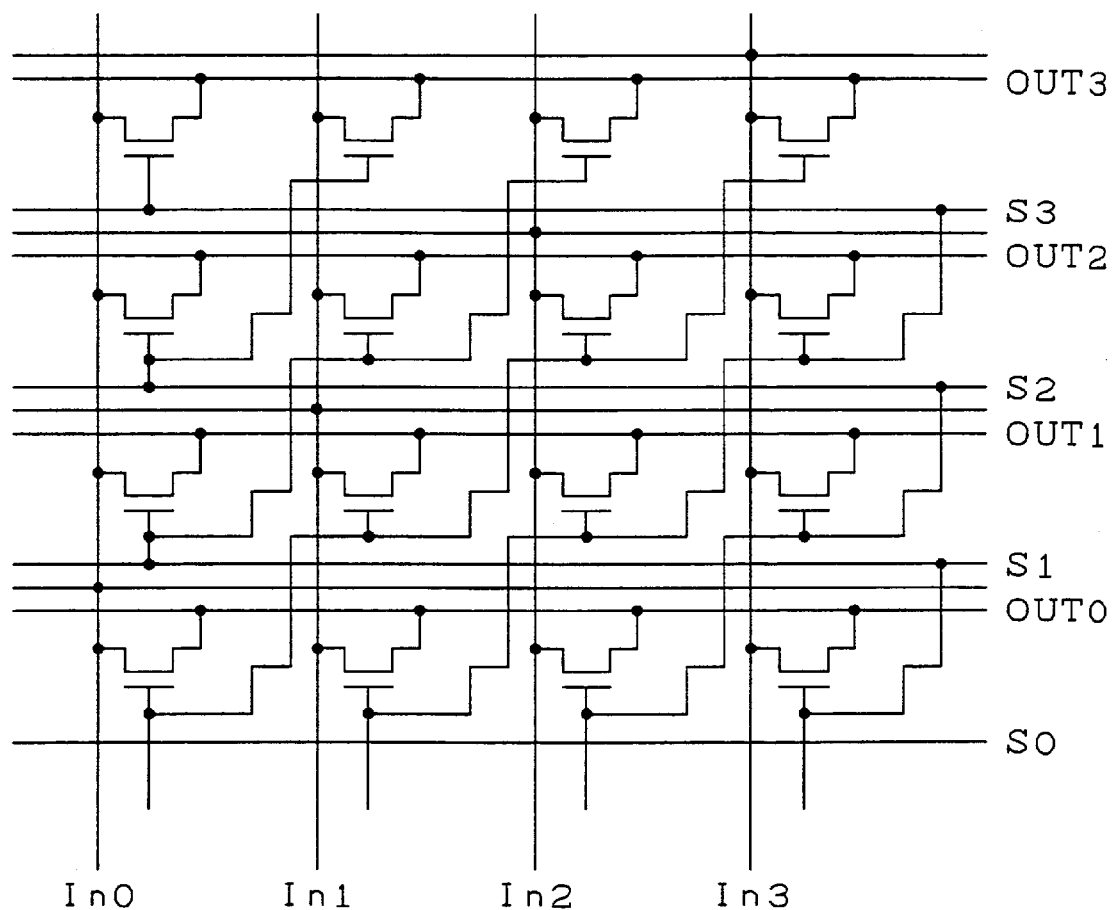
FIG. 17 is a schematic circuit diagram showing the structure of a barrel shifter incorporated into a register file according to a seventh embodiment of the present invention.
Figure 18:
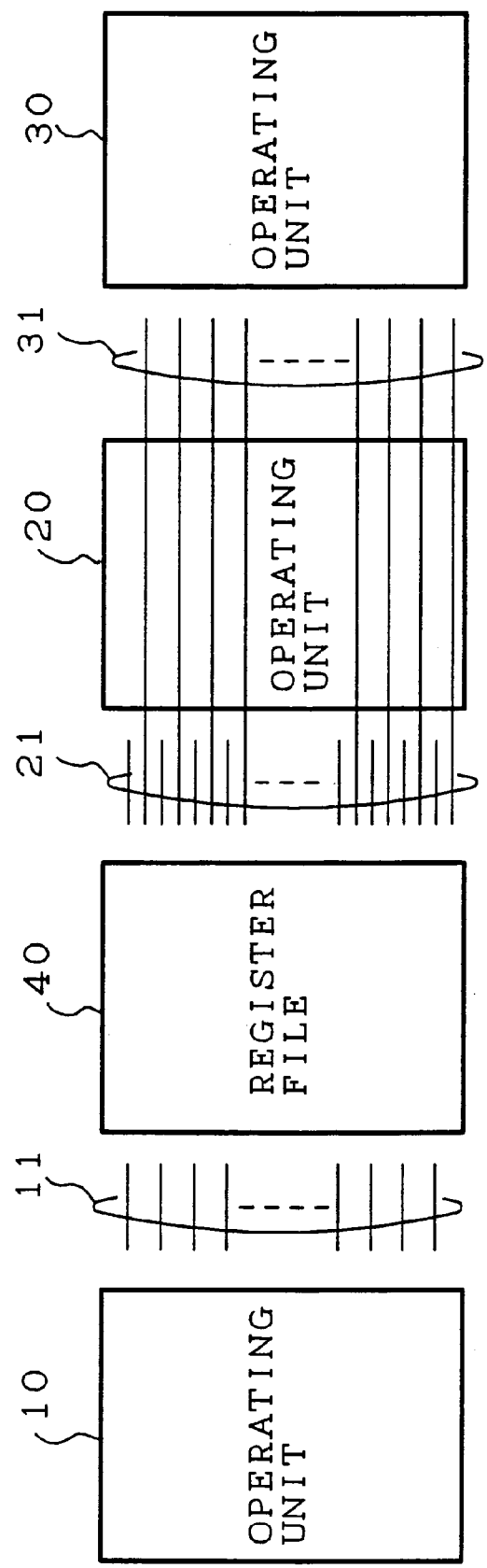
FIG. 18 is a block diagram showing the structure of a prior art processing apparatus provided with three operating units.

Referring now to FIG. 17, there is illustrated a schematic circuit diagram showing the structure of a barrel shifter which is incorporated into a register file of a processing apparatus according to a seventh embodiment of the present invention. For simplicity, a 4×4 barrel shifter is illustrated in FIG. 17; however, a 8×8 barrel shifter is actually used in the case of for example a register file comprised of a plurality of 8-bit registers as shown in FIG. 4.

In the barrel shifter shown in FIG. 17, 4-bit data is input to input terminals In0 to In3 first. One of shift control signal input terminals S0 to S3 is selected. Then, when a selecting signal is applied to the selected one of the shift control signal input connection points S0 to S3, the data is shifted the number of bits specified by the selection of the shift control signal input terminals S0 to S3 and is delivered via output terminals Out0 to Out3. In the case of a 8×8 barrel shifter, 8-bit data is input to eight input terminals. The data is shifted the number of bits specified by the selecting of one from eight shift control signal input terminals and is delivered via eight output terminals. Such the 8×8 barrel shifter is incorporated into each of the registers of the register file 400 as shown in FIG. 2 such that the eight input terminals of the barrel shifter are connected to the outputs of the register cells of each of the registers, respectively, and 8-bit data which is shifted the number of bits specified by the selecting of one from shift control signal input terminals of the barrel shifter can be furnished into the signal lines of the data buses 101, 201, and 301.

Some variants may be made in the exemplary of the present embodiment shown. The barrel shifter shown in FIG. 17 can be incorporated into any register files of the other embodiments mentioned above. Furthermore, the barrel shifter incorporated into each of the register cells is adapted to shift data applied thereto by a shift amount when the data is written into each of the register cells in the register file 400 rather than when the data is read out of each of the register cells.

Therefore, since the processing unit according to the seventh embodiment can shift data, which is stored or to be stored in the register file, by a shift amount, and then transfer the data to operating units, it can reduce the loads on the operating units due to the shifting operation.

As previously explained, the present invention offers the following advantages.

In accordance with a preferred embodiment of the present invention, there is provided a processing apparatus wherein first, second, and third operating units are arranged opposite to different three sides of a rectangle-shaped register file comprised of a plurality of registers, and each of the operating units is connected to the register file by way of a different data bus. Therefore, the embodiment offers the advantage of being able to reduce the whole load on the data bus lines, thereby increasing the processing speed of the processing apparatus, reducing power consumption, and improving the reliability of the processing apparatus.

In accordance with another preferred embodiment of the present invention, each of a plurality of register cells which construct each of the plurality of registers can handle or drive the data buses connected to the first, second, and third operating units simultaneously. Therefore, the embodiment offers the advantage of being able to perform data processing at high speed in the case where the first, second, and third operating units need to get common data from the register file.

In accordance with another preferred embodiment of the present invention, each of the plurality of register cells can handle or drive the data buses connected the first and third operating units simultaneously, and handle or drive the data buses connected to the second and third operating units simultaneously. Therefore, the embodiment offers the advantage of being able to reduce the data bus driving load on each of the register cells.

In accordance with another preferred embodiment of the present invention, each of the plurality of register cells can handle or drive the data buses connected the first and second operating units simultaneously, and handle or drive the data buses connected to the third operating unit independently of the other data buses. Therefore, the embodiment offers the advantage of being able to reduce the data bus driving load on each of the register cells.

In accordance with another preferred embodiment of the present invention, at least one of the first, second, and third data buses includes a plurality of write signal lines for writing data into each of the plurality of register cells. Therefore, the embodiment offers the advantage of being able to write data into each of the plurality of register cells.

In accordance with another preferred embodiment of the present invention, each of the plurality of register cells includes a signal bypass unit which is comprised of tristate buffers and is inserted between the input and at least an output of each of the plurality of register cells, for directly connecting the input with the outputs so as to deliver data applied to the input by way of the outputs of each of the plurality of register cells. Therefore, the embodiment offers the advantage of being able to transfer data from an operating unit to anther operating unit without latching the data.

In accordance with another preferred embodiment of the present invention, the plurality of register cells of one of the plural registers are arranged on a diagonal of the rectangular contour of the register file. Therefore, the embodiment offers the advantage of being able to ensure the match between the order of bits of one of the data buses and the order of bits of each of the other data buses with respect to the register arranged diagonally without providing specific connection points or the like by which a connection between the register arranged diagonally and each of the data buses can be made.

In accordance with another preferred embodiment of the present invention, the first, second, and third data buses are divided into a plurality of bus groups each including at least one data bus. Furthermore, each of the plurality of register cells includes a cell unit for latching data applied thereto, and a plurality of driver units electrically connected to the cell unit, each for amplifying data from the cell unit and driving a different bus group including at least one data bus so as to furnish the data by way of the bus group. Therefore, the embodiment offers the advantage of being able to reduce the load on each of the driver units.

In accordance with another preferred embodiment of the present invention, each of the plural registers in the register file includes a shift unit for shifting data stored or to be stored in each of the plurality of registers by a shift amount specified by a control signal applied thereto. Therefore, the embodiment offers the advantage of being able to perform data processing without burdening each of the operating units with shifting operation.

Many widely different embodiments of the present invention may be constructed without departing from the spirit and scope of the present invention. It should be understood that the present invention is not limited to the specific embodiments described in the specification, except as defined in the appended claims.

What is claimed is:

1. A processing apparatus comprising:
   a register file having a rectangle-shaped contour and including a plurality registers of each of which is comprised of a plurality of register cells;
   a first operating unit located opposite to a first side of the rectangular contour of said register file;
   a second operating unit located opposite to a second side of the rectangular contour of said register file which is opposite to the first side;
   a third operating unit located opposite to a third side of the rectangular contour of said register file which is different from the first and second sides;
   a first data bus disposed for transferring data between said first operating unit and said register file;
   a second data bus disposed for transferring data between said second operating unit and said register file; and
   a third data bus disposed for transferring data between said third operating unit and said register file,
   wherein each of said plurality of register cells includes first and second outputs which can be handled independently in order for each of said plurality of register cells to furnish data stored therein by way of each of the first and second outputs, and wherein said third data bus includes a first section including a plurality of signal lines connected with the first outputs of said plurality of register cells as well as the signal lines of said first data bus and a second section including a plurality of signal lines connected with the second outputs of said plurality of register cells as well as the signal lines of said second data bus.

2. The processing apparatus according to claim 1, wherein each of said first, second, and third data buses includes a plurality of signal lines which are electrically connected to each of said plurality of registers in such a manner that data can be properly transferred between each of said first, second, and third operating units and each of said registers or between said operating units while the order of bits of the data is maintained.

3. The processing apparatus according to claim 2, wherein each of said plurality of register cells includes an input for receiving data applied thereto so as to write the data into each of said plurality of register cells, and wherein at least one of said first, second, and third data bus includes a plurality of write signal lines connected to the inputs of said plurality of register cells for writing data into each of said plurality of register cells by way of the input of each of said plurality of register cells.

4. The processing apparatus according to claim 3, wherein each of said plurality of register cells includes a signal bypass means inserted between the input and at least one output of each of said plurality of register cells, for directly connecting the input with the output in response to a control signal applied thereto so as to deliver data applied to the input by way of the output of each of said plurality of register cells.

5. The processing apparatus according to claim 2, wherein the plurality of register cells of one of said plural registers are arranged on a diagonal of the rectangular contour of said register file.

6. The processing apparatus according to claim 1, wherein each of said plurality of register cells includes an input for receiving data applied thereto so as to write the data into each of said plurality of register cells, and wherein at least one of said first, second, and third data bus includes a plurality of write signal lines for writing data into each of said plurality of register cells by way of the input of each of said plurality of register cells.

7. The processing apparatus according to claim 1, wherein said first, second, and third data buses are divided into a plurality of bus groups each including at least one data bus, and wherein each of said plurality of register cells includes a cell unit for latching data applied thereto, and a plurality of driver units electrically connected to said cell unit, each for amplifying data from said cell unit and driving a different bus group including at least one data bus so as to furnish the data by way of the bus group.

8. The processing apparatus according to claim 1, wherein said register file includes a shift means for shifting data stored or to be stored in each of said plurality of registers in said register file by a shift amount specified by a control signal applied thereto.

9. The processing apparatus according to claim 8, wherein each of said first, second, and third data buses includes a plurality of signal lines which are electrically connected to each of said plurality of registers in such a manner that data can be properly transferred between each of said first, second, and third operating units and each of said registers or between said operating units while the order of bits of the data is maintained.

10. The processing apparatus according to claim 9, wherein each of said plurality of register cells includes an input for receiving data applied thereto so as to write the data into each of said plurality of register cells, and wherein at least one of said first, second, and third data bus includes a plurality of write signal lines connected to the inputs of said plurality of register cells for writing data into each of said plurality of register cells by way of the input of each of said plurality of register cells.

11. The processing apparatus according to claim 10, wherein each of said plurality of register cells includes a signal bypass means inserted between the input and at least one output of each of said plurality of register cells, for directly connecting the input with the output in response to a control signal applied thereto so as to deliver data applied to the input by way of the output of each of said plurality of register cells.

12. The processing apparatus according to claim 9, wherein the plurality of register cells of one of said plural registers are arranged on a diagonal of the rectangular contour of said register file.

13. The processing apparatus according to claim 8, wherein each of said plurality of register cells includes an input for receiving data applied thereto so as to write the data into each of said plurality of register cells, and wherein at least one of said first, second, and third data bus includes a plurality of write signal lines for writing data into each of said plurality of register cells by way of the input of each of said plurality of register cells.

14. The processing apparatus according to claim 8, wherein said first, second, and third data buses are divided into a plurality of bus groups each including at least one data bus, and wherein each of said plurality of register cells includes a cell unit for latching data applied thereto, and a plurality of driver units electrically connected to said cell unit, each for amplifying data from said cell unit and driving a different bus group including at least one data bus so as to furnish the data by way of the bus group.

15. A processing apparatus comprising:
   a register file having a rectangle-shaped contour and including a plurality of registers each of which is comprised of a plurality of register cells;
   a first operating unit located opposite to a first side of the rectangular contour of said register file;
   a second operating unit located opposite to a second side of the rectangular contour of said register file which is opposite to the first side;
   a third operating unit located opposite to a third side of the rectangular contour of said register file which is different from the first and second sides;
   a first data bus disposed for transferring data between said first operating unit and said register file;
   a second data bus disposed for transferring data between said second operating unit and said register file; and
   a third data bus disposed for transferring data between said third operating unit and said register file,
   wherein each of said plurality of register cells includes first and second outputs which can be handled independently in order for each of said plurality of register cells to furnish data stored therein by way of each of the first and second outputs, and wherein the signal lines of each of said first and second data buses are connected with the first outputs of said plurality of register cells and the signal lines of said third data bus are connected with the second outputs of said plurality of register cells.

16. A processing apparatus comprising:

a register file having a rectangle-shaped contour and including a plurality of registers each of which is comprised of a plurality of register cells;

a first operating unit located opposite to a first side of the rectangular contour of said register file;

a second operating unit located opposite to a second side of the rectangular contour of said register file which is opposite to the first side;

a third operating unit located opposite to a third side of the rectangular contour of said register file which is different from the first and second sides;

a first data bus disposed for transferring data between said first operating unit and said register file;

a second data bus disposed for transferring data between said second operating unit and said register file; and a third data bus disposed for transferring data between said third operating unit and said register file, wherein said register file includes a shift means for shifting data stored or to be stored in each of said plurality of registers in said register file by a shift amount specified by a control signal applied thereto, wherein each of said plurality of register cells includes first and second outputs which can be handled independently in order for each of said plurality of register cells to furnish data stored therein by way of each of the first and second outputs, and wherein the signal lines of each of said first and second data buses are connected with the first outputs of said plurality of register cells and the signal lines of said third data bus are connected with the second outputs of said plurality of register cells.

* * * * *